(12) United States Patent
Zhou et al.

(10) Patent No.: US 10,749,163 B2
(45) Date of Patent: Aug. 18, 2020

(54) CAP ASSEMBLY AND POWER BATTERY

(71) Applicant: Contemporary Amperex Technology Co., Limited, Ningde, Fujian (CN)

(72) Inventors: Yong Zhou, Ningde (CN); Zhijun Guo, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 337 days.

(21) Appl. No.: 15/927,515

(22) Filed: Mar. 21, 2018

(65) Prior Publication Data
US 2019/0237743 A1 Aug. 1, 2019

(30) Foreign Application Priority Data
Feb. 1, 2018 (CN) .................... 2018 2 0179587 U

(51) Int. Cl.
| | |
|---|---|
| *H01M 2/36* | (2006.01) |
| *H01M 2/04* | (2006.01) |
| *H01M 2/12* | (2006.01) |
| *H01M 10/04* | (2006.01) |

(52) U.S. Cl.
CPC ............ *H01M 2/365* (2013.01); *H01M 2/04* (2013.01); *H01M 2/0456* (2013.01); *H01M 2/12* (2013.01); *H01M 2/36* (2013.01); *H01M 10/0431* (2013.01)

(58) Field of Classification Search
CPC .. H01M 10/0431; H01M 2/04; H01M 2/0456; H01M 2/12; H01M 2/36; H01M 2/365
See application file for complete search history.

(56) References Cited

U.S. PATENT DOCUMENTS

| | | | |
|---|---|---|---|
| 2009/0136843 A1* | 5/2009 | Yamamoto | H01M 2/08 429/179 |
| 2017/0018748 A1* | 1/2017 | Matsuura | H01M 2/1223 |
| 2017/0098816 A1 | 4/2017 | Guen | |
| 2017/0149047 A1 | 5/2017 | Guen | |

FOREIGN PATENT DOCUMENTS

| | | |
|---|---|---|
| CN | 106450070 A | 2/2017 |
| EP | 1659649 A1 | 5/2006 |

OTHER PUBLICATIONS

Extended European Search Report for European Application No. 18165104.3, dated Jun. 12, 2018, 6 pages.
The Official Action and search report dated Sep. 5, 2019 for European application No. 18165104.3, 4 pages.

\* cited by examiner

*Primary Examiner* — Lingwen R Zeng
(74) *Attorney, Agent, or Firm* — Law Offices of Liaoteng Wang

(57) ABSTRACT

The present disclosure relates to a cap assembly and a power battery. The cap assembly comprises a cap plate including a top surface, a bottom surface opposed to the top surface in a thickness direction and a liquid injection hole penetrating through the cap plate from the top surface to the bottom surface, the liquid injection hole having an inlet provided on the top surface and an outlet provided on the bottom surface; and a blocking member provided on the bottom surface, a projection of the blocking member in the thickness direction at least partially covers the outlet, wherein a fluid channel is formed between the blocking member and the cap plate, and the fluid channel communicates with the outlet of the liquid injection hole. The cap assembly can be applied to the power battery.

18 Claims, 4 Drawing Sheets

CAP ASSEMBLY AND POWER BATTERY

CROSS-REFERENCE TO RELATED APPLICATION

This application claims priority to the Chinese Patent Application No. 201820179587.0, filed on Feb. 1, 2018, which is hereby incorporated by reference in its entirety.

TECHNICAL FIELD

The present disclosure relates to the technical field of power battery, particularly to a cap assembly and a power battery.

BACKGROUND

A secondary battery generally includes an electrode assembly, a case, and a cap assembly. The electrode assembly is formed by a positive electrode sheet, a negative electrode sheet, and a separating membrane disposed between the positive electrode sheet and the negative electrode sheet that are wound around a winding axis. The electrode assembly is received in the case, and the cap assembly is assembled with the case and disposed in correspondence to an end portion of the electrode assembly along the winding axis. The cap assembly includes a cap plate and an electrode terminal disposed on the cap sheet, wherein an electrode tab of the electrode assembly is electrically connected with the electrode terminal of the cap assembly. The cap plate is provided with a liquid injection hole communicating with a sealed space.

However, since the liquid injection hole on the cap plate and the end portion of the electrode assembly along the winding axis are opposite to each other in position, when an electrolyte is injected into the case through the liquid injection hole (in order to increase an efficiency of the electrolyte injection, it is generally necessary to increase a pressure of the electrolyte injection), the electrolyte will impact the end portion of the electrode assembly along the winding axis. In this case, as the impact force from the electrolyte is too large, deformation and shift of the separating membrane between the positive electrode sheet and negative electrode sheet at the end position may occur, causing the positive and negative electrode sheets to contact with each other and thus causing a short circuit.

SUMMARY

The present disclosure provides a cap assembly and a power battery. In the case that the cap assembly is applied to the power battery, the flow direction of the electrolyte can be changed and the impact force on the end of the electrode assembly can be reduced during liquid injection.

According to one aspect, the present disclosure provides a cap assembly for a power battery, wherein the cap assembly comprising a cap plate including a top surface, a bottom surface opposed to the top surface in a thickness direction, and a liquid injection hole penetrating through the cap plate from the top surface to the bottom surface and having an inlet provided on the top surface and an outlet provided on the bottom surface; and a blocking member provided on the bottom surface of the cap plate, wherein a projection of the blocking member in the thickness direction at least partially covers the outlet of the liquid injection hole, wherein a fluid channel is formed between the blocking member and the cap plate, and the fluid channel communicates with the outlet of the liquid injection hole.

According to one aspect of the embodiments of the present disclosure, wherein the projection of the blocking member in the thickness direction completely covers the outlet of the liquid injection hole.

According to one aspect of the embodiments of the present disclosure, wherein the cap plate comprises a first end and a second end opposed to the first end in a length direction, wherein the liquid injection hole and the blocking member are provided at the first end.

According to one aspect of the embodiments of the present disclosure, wherein the cap plate comprises a boss provided on the bottom surface, disposed in correspondence to the first end, and adapted to press against an electrode assembly of the power battery, wherein the blocking member is connected to the boss and has a bottom face flush with that of the boss.

According to one aspect of the embodiments of the present disclosure, wherein the cap assembly further comprises a vent plate which is disposed on the top surface and covers the liquid injection hole, wherein an annular seam is formed between an edge of the vent plate and the top surface of the cap plate, so that the vent plate and the cap plate are hermetically connected.

According to one aspect of the embodiments of the present disclosure, wherein an axis of the liquid injection hole is offset from an axis of the vent plate, and the axis of the vent plate is closer to the second end of the cap plate than the axis of the liquid injection hole.

According to one aspect of the embodiments of the present disclosure, wherein a ratio of a surface area of the vent plate located inside the annular seam to a cross-sectional area of the liquid injection hole is of 1.5 to 10.

According to one aspect of the embodiments of the present disclosure, wherein the top surface of the cap plate is provided with a recess depressed toward the bottom surface, wherein the liquid injection hole communicates with the recess and the vent plate is accommodated in the recess.

According to one aspect of the embodiments of the present disclosure, wherein the blocking member and the cap plate are formed as an integral structure.

The cap assembly of the embodiment of the present disclosure includes a cap plate which has a liquid injection hole and a blocking member which is disposed on the cap plate and used for covering the liquid injection hole. In the case that the cap assembly of the present embodiment is applied to a power battery, the electrolyte injected from the liquid injection hole can be blocked by the blocking member during electrolyte injection operation of the power battery, resulting in that the flow direction of the electrolyte changes and the electrolyte no longer continues to flow along the axis of the liquid injection hole. In this way, the flow rate of the electrolyte can be reduced by the blocking member, so that the impact force exerted by the electrolyte on the end portion of the electrode assembly included in the power battery can be reduced compared to the case that the electrolyte discharges directly from the liquid injection hole, and the probability of the displacement of the separating membrane included in the electrode assembly caused by a large impact force can be reduced, thereby improving the safety performance of the power battery.

On the other hand, the present disclosure provides a power battery, wherein comprising a case having an opening; an electrode assembly formed by a positive electrode sheet, a negative electrode sheet, and a separating membrane provided between the positive electrode sheet and the negative electrode sheet that are wound around a winding axis, the electrode assembly having two end portions opposed to each other along the winding axis and the electrode assembly being disposed in the case; and a cap assembly as mentioned above for covering the opening of the case and disposed in correspondence to the end portion of the electrode assembly, wherein the blocking member is disposed between the cap plate and the end portion of the electrode assembly.

BRIEF DESCRIPTION OF THE DRAWINGS

Below, features, advantages, and technical effects of exemplary embodiments of the present disclosure will be described with reference to accompanying drawings.

Figure 1:
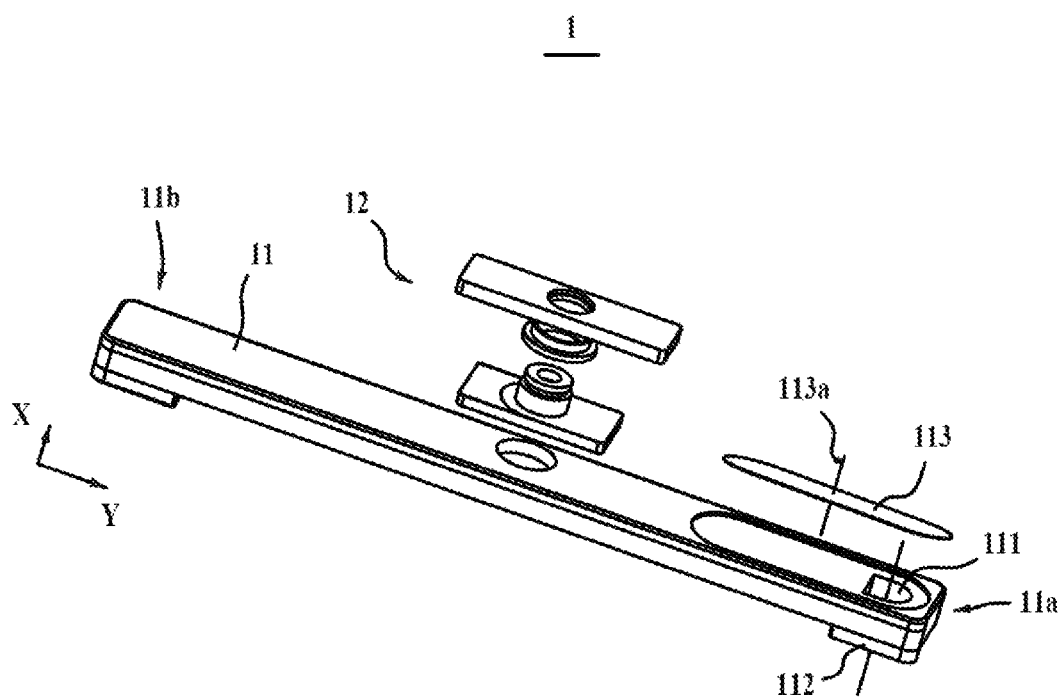
FIG. 1 is a schematic exploded view of a structure of a cap assembly according to an embodiment of the present disclosure.

In the drawings, the drawings are not drawn to scale.

DESCRIPTION OF REFERENCE SIGNS

1 Cap assembly;
11 Cap plate;
11a First end;
11b Second end;
111 Liquid injection hole;
112 Boss;
113 Vent plate;
113a Axis;
12 Electrode terminal;
X Thickness direction;
Y Length direction;
2 Blocking member;
3 Fluid channel;
4 Case;
5 Electrode assembly;
51 Positive electrode tab;
52 Negative electrode tab.

DETAILED DESCRIPTION

Below, the implementations of the present disclosure will be further described in detail with reference to the accompanying drawings. The following embodiments described in detail and drawings serve to exemplarily illustrate the principle of the present disclosure, and do not limit the scope of the present disclosure, i.e., the present disclosure is not limited to the described embodiments.

In the description of the present disclosure, it should be noted that the term of "multiple" means two or more unless otherwise specified; the terms of "upper", "lower", "left", "right", "inner", "outer" and the like are merely used for conveniently and simply describing the present disclosure, rather than indicating or implying that the referred device or element must have a particular orientation, or be constructed and operated in a particular orientation, and thus cannot be understood as a limitation to the present disclosure. In addition, the terms of "first", "second" and the like are only used for descriptive purposes and are not to be construed as indicating or implying relative importance.

In the description of the present disclosure, it should also be noted that the terms of "mounted", "connected with", and "connected" should be interpreted in a broad sense unless otherwise clearly defined and limited. For example, these terms may refer to a fixed connection, a detachable connection, or an integral connection; and these terms may refer to a direct connection or an indirect connection through an intermediary. For a person skilled in the art, specific meanings of the above terms in the present disclosure may be understood according to particular situations.

Figure 2:
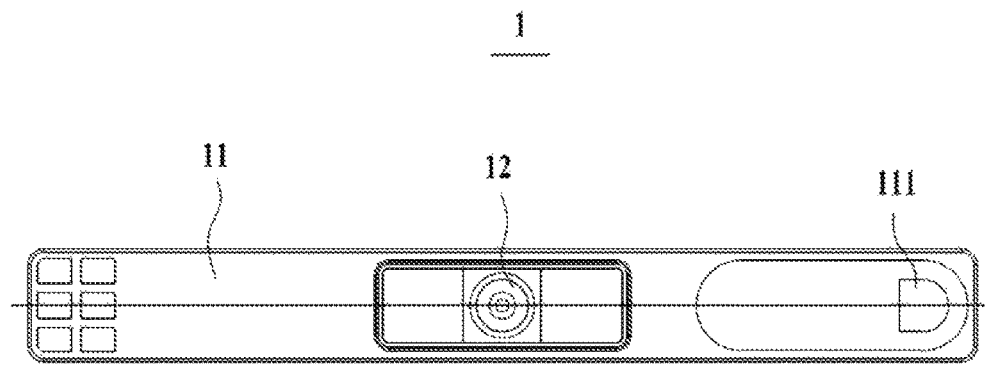
FIG. 2 is a schematic top view of a structure of a cap assembly according to an embodiment of the present disclosure.
Figure 3:
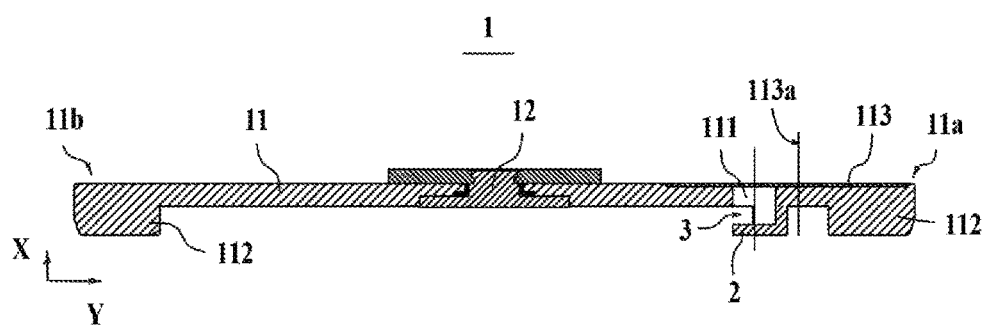
FIG. 3 is a schematic sectional view of a structure of a cap assembly according to an embodiment of the present disclosure.
Figure 4:
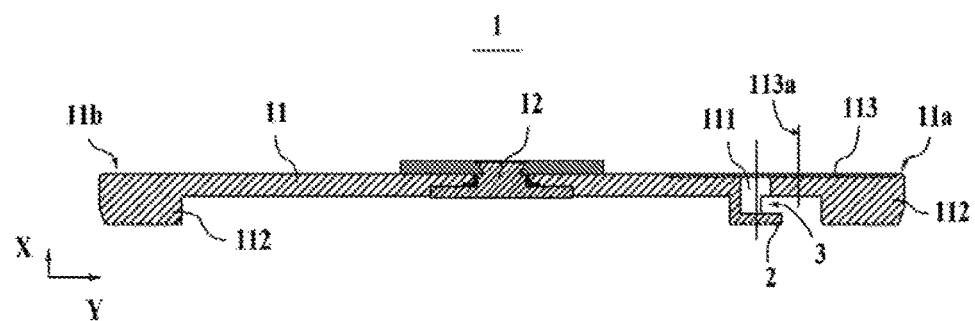
FIG. 4 is a schematic sectional view of a structure of a cap assembly according to a further embodiment of the present disclosure.
Figure 5:
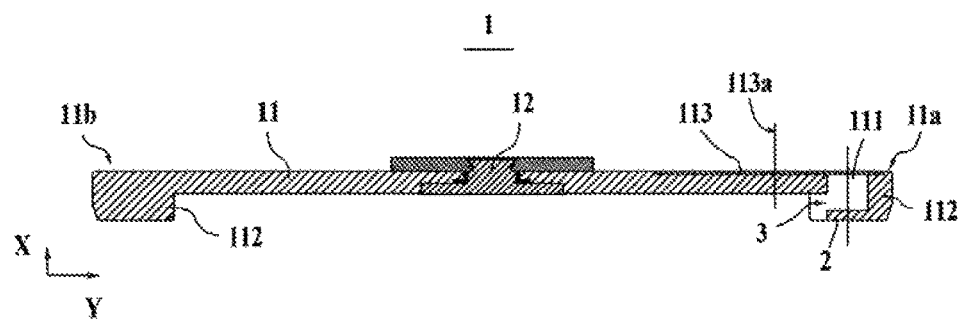
FIG. 5 is a schematic sectional view of a structure of a cap assembly according to a further embodiment of the present disclosure.
Figure 6:
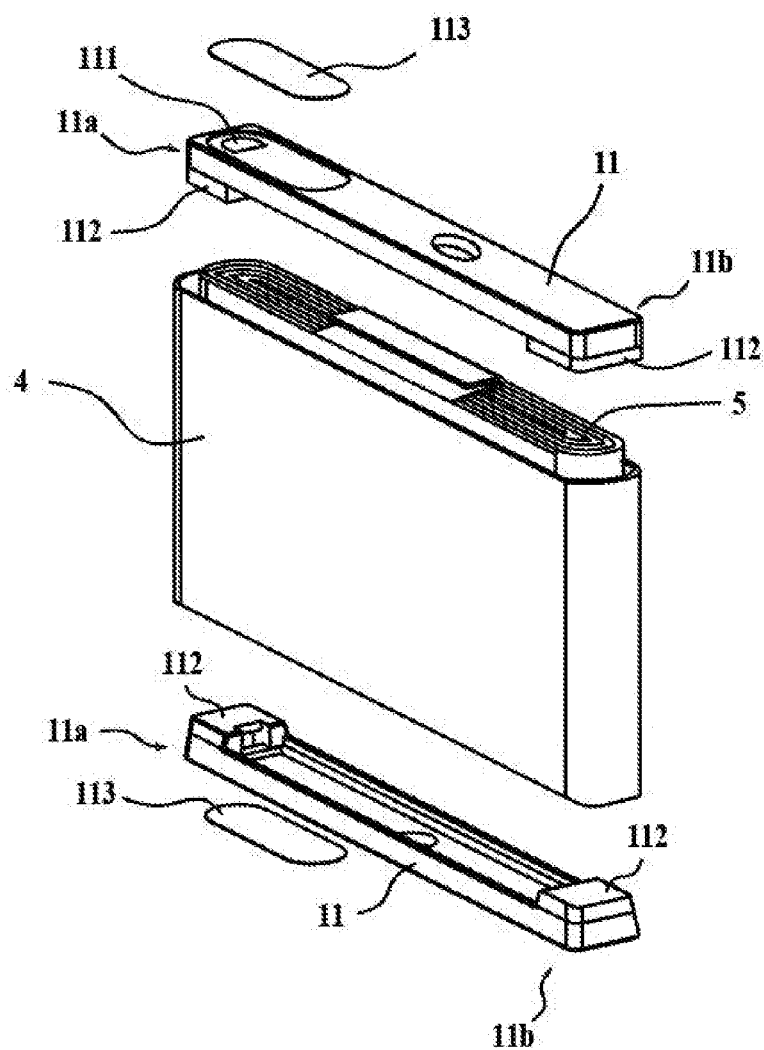
FIG. 6 a schematic exploded view of a structure of a power battery according to an embodiment of the present disclosure.
Figure 7:
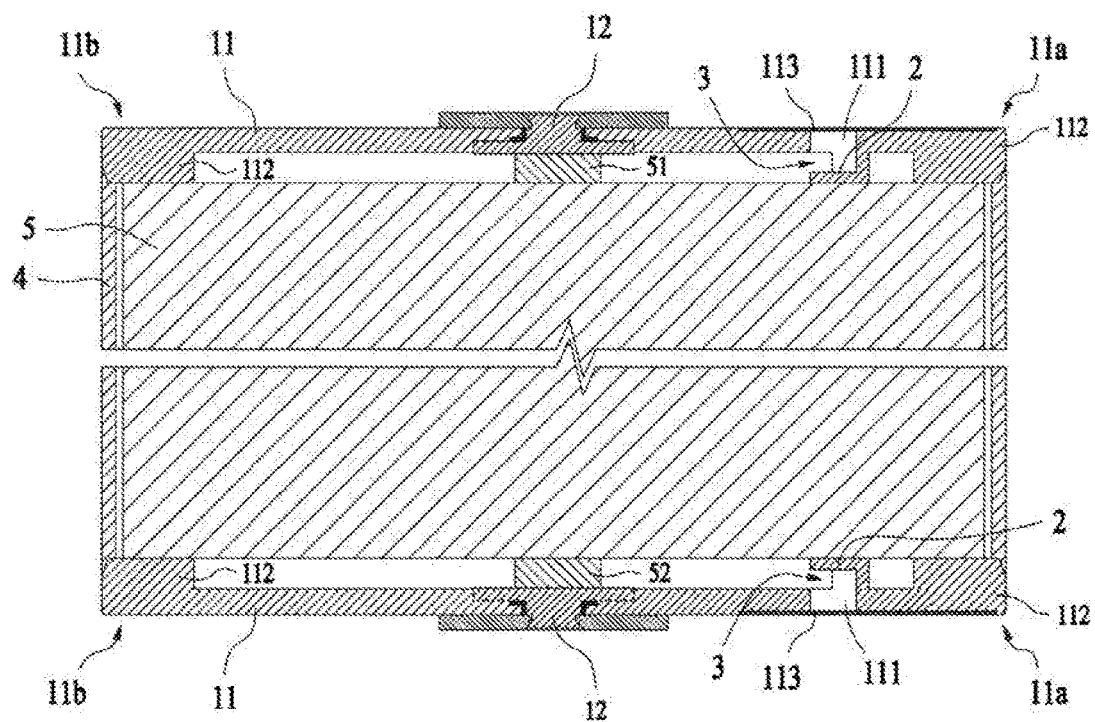
FIG. 7 is a schematic sectional view of a structure of a power battery according to an embodiment of the present disclosure.
Figure 8:
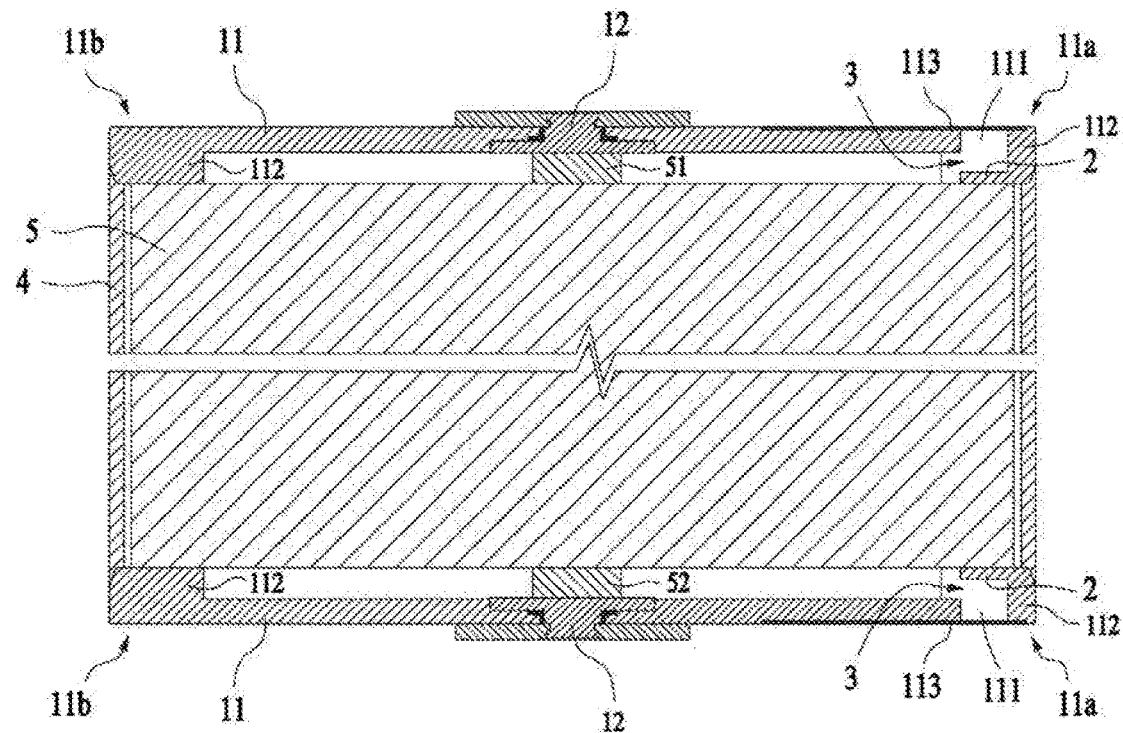
FIG. 8 is a schematic sectional view of a structure of a power battery according to a further embodiment of the present disclosure.

For a better understanding of the present disclosure, the cap assembly 1 according to the embodiments of the present disclosure will be described in detail below with reference to FIG. 1 to FIG. 8. FIG. 1 schematically shows an exploded structure of a cap assembly according to an embodiment of the present disclosure. FIG. 2 schematically shows a structure of a cap assembly according to an embodiment of the present disclosure in a top view. FIG. 3 schematically shows a structure of a cap assembly according to an embodiment of the present disclosure in a sectional view. FIG. 4 schematically shows a structure of a cap assembly according to another embodiment of the present disclosure in a sectional view. FIG. 5 schematically shows a structure of a cap assembly according to another embodiment of the present disclosure in a sectional view. FIG. 6 schematically shows an exploded structure of a power battery according to an embodiment of the present disclosure. FIG. 7 schematic shows a structure of a power battery according to an embodiment of the present disclosure in a sectional view. FIG. 8 schematically a structure of a power battery according to another embodiment of the present disclosure in a sectional view.

As shown in FIG. 1 and FIG. 6, the cap assembly 1 according to the embodiment of the present disclosure can be applied to a power battery. The power battery of the present disclosure includes a case 4, an electrode assembly 5, and the cap assembly 1. The electrode assembly of the present disclosure is formed by a positive electrode sheet, a negative electrode sheet, and a separating membrane disposed between the positive electrode sheet and the negative electrode sheet, that are wound around a winding axis. The electrode assembly 5 has two end portions opposed to each other along the winding axis. The positive electrode sheet, the negative electrode sheet, and the separating membrane provided between the positive electrode sheet and the negative electrode sheet are wound, forming a spiral coil as seen from at each end portion. The electrode assembly 5 is disposed in the case 4, and the cap assembly 1 is disposed in correspondence to the end portion of the electrode assembly 5.

The cap assembly 1 in the present disclosure includes a cap plate 11, an electrode terminal 12 disposed on the cap plate 11, and a blocking member 2 disposed on the cap plate 11. The cap plate 11 of the present disclosure has a predetermined length, width and thickness. Referring to an orientation of the cap assembly 1 as shown in FIG. 1, a thickness direction of the cap plate 11 is consistent with a thickness direction X, a length direction of the cap plate 11 is consistent with a length direction Y, and a width direction (not shown in the figure) of the cap plate 11 is perpendicular to the thickness direction X and the length direction Y. The cap plate 11 of the present disclosure includes a top surface and a bottom surface opposed to the top surface in the thickness direction X, and a liquid injection hole 111 penetrating through the cap plate 11 from the top surface to the bottom surface. The liquid injection hole 111 has an inlet provided on the top surface and an outlet provided on the bottom surface. In the present embodiment, in the case that the cap assembly 1 is applied to a power battery, the cap assembly 1 can be hermetically connected with the case 4 to form a sealed space for accommodating the electrode assembly 5, and an electrolyte can be injected into the sealed space through the liquid injection hole 111. In the present embodiment, the blocking member 2 is disposed on the bottom surface of the cap plate 11. The blocking member 2 is located below the liquid injection hole 111, and a projection of the blocking member 2 in the thickness direction X at least partially covers the outlet of the liquid injection hole 111. A fluid channel 3 is formed between the blocking member 2 and the cap plate 11. The fluid channel 3 communicates with the outlet of the liquid injection hole 111. The fluid channel 3 is formed at a predetermined angle with respect to the liquid injection hole 111. The electrolyte injected from the inlet of the liquid injection hole 111 flows in the thickness direction X to the outlet of the liquid injection hole 111, turns at a predetermined angle due to the blocking of the blocking member 2 and then discharges from the fluid channel 3. Thus, the electrolyte is prevented from continuing to flow in the thickness direction X after discharging from the outlet of the liquid injection hole 111. In this way, during the electrolyte injection operation of the power battery, a flow rate of the electrolyte injected from the liquid injection hole 111 under high pressure will be reduced due to the blocking of the blocking member 2, and thus an impact force applied to the end portion of the electrode assembly 5 will be reduced, thereby reducing the probability of a short circuit between the positive electrode sheet and the negative electrode sheet, caused by a displacement of the separating membrane of the electrode assembly 5 under the impact force of the electrolyte. As a result, a yield rate of the power battery after the electrolyte injection operation can be improved and meanwhile the potential safety hazard of the power battery can be eliminated, ensuring the safety during subsequent use of the power battery.

In one embodiment, the projection of the blocking member 2 in the thickness direction X completely covers the outlet of the liquid injection hole 111, so that all the electrolyte discharging from the outlet of the liquid injection hole 111 has to turn at a predetermined angle before discharging from the fluid channel 3, further effectively preventing the electrolyte from impacting the end portion of the electrode assembly 5.

In one embodiment, as shown in FIG. 3, the cap plate 11 includes a first end 11a and a second end 11b opposed to the first end 11a in the length direction Y. The liquid injection hole 111 and the blocking member 2 are both disposed on the first end 11a. A liquid outlet of the fluid channel 3 formed by the cap plate 11 and the blocking member 2 faces the electrode terminal 12. The electrolyte injected from the inlet of the liquid injection hole 111 turns at a predetermined angle due to the blocking of the blocking member 2 before discharging from the fluid channel 3. In the present embodiment, preferably, a predetermined angle of 90° is formed between the fluid channel 3 and the liquid injection hole 111, so that the electrolyte can be injected in the thickness direction X and discharge in the length direction Y. Therefore, the flow rate of the electrolyte entering the case 4 can be reduced, the electrolyte will not directly impact the end portion of the electrode assembly 5 any longer, and the probability of the short circuit between the positive electrode sheet and the negative electrode sheet due to the insulation failure which may be caused by the displacement of the separating membrane under the impact of the electrolyte, can be reduced.

In the case that the cap assembly 1 of the present embodiment is applied to a power battery and the electrolyte injection operation for the power battery is performed, the power battery can be placed horizontally, that is, the cap plate 11 is placed in an upright position (which can be obtained by rotating the power battery oriented as shown in FIG. 7 or FIG. 8 by 90 degrees in a counterclockwise direction). In this case, the first end 11a is located above the second end 11b, and then the electrolyte injection operation can be performed. In this way, since the liquid injection hole 111 disposed on the first end 11a of the cap plate 11 is located at a higher position, the electrolyte discharging from the fluid channel 3 will flow along a parabolic trajectory due to its own gravity, and thus the impact force applied on the end portion of the electrode assembly 5 can be reduced.

In the present embodiment, optionally, the blocking member 2 and the cap plate 11 are formed as an integral structure, which can improve the connection strength between them and facilitate one-time manufacturing of the two parts, thereby reducing the processing steps and the processing difficulties.

In another embodiment, as shown in FIG. 4, the liquid outlet of the fluid channel 3 formed by the blocking member 2 and the cap plate 11 faces the first end 11a of the cap plate 11. The electrolyte injected from the inlet of the liquid injection hole 111 turns at a predetermined angle due to the blocking of the blocking member 2 before discharging from the fluid channel 3. In the present embodiment, preferably, a predetermined angle of 90° is formed between the fluid channel 3 and the liquid injection hole 111, so that the electrolyte can be injected in the thickness direction X and discharge in the length direction Y. In this way, the flow rate of the electrolyte entering the case 4 can be reduced, the electrolyte will not directly impact the end portion of the electrode assembly 5 any longer, and the probability of the short circuit between the positive electrode sheet and the negative electrode sheet due to the insulation failure which may be caused by the displacement of the separating membrane under the impact of the electrolyte, can be reduced.

In the case that the cap assembly 1 of the present embodiment is applied to a power battery and a liquid injection for the power battery is performed, the power battery can be placed horizontally, that is, the cap plate 11 is placed in an upright position (which can obtained by rotating the power battery oriented as shown in FIG. 7 or FIG. 8 by 90 degrees in a counterclockwise direction). In this case, the first end 11a is located above the second end 11b, and then the electrolyte injection operation can be performed. In this way, since the liquid injection hole 111 provided on the first end 11a of the cap plate 11 is located at a higher position, the electrolyte discharging from the fluid channel 3 will flow along a parabolic trajectory due to its own gravity, and thus the impact force applied on the end portion of the electrode assembly 5 can be reduced. In addition, since the liquid outlet of the fluid channel 3 faces the first end 11a, more electrolyte can be injected into the case 4 while preventing the injected electrolyte from overflowing via the liquid injection hole 111.

In the present embodiment, optionally, the blocking member 2 and the cap plate 11 are formed as an integral structure, which can improve the connection strength between them and facilitate one-time manufacturing of the two parts, thereby reducing the processing steps and the processing difficulties.

In another embodiment, as shown in FIG. 5, the cap plate 11 includes a first end 11a and a second end 11b opposed to the first end 11a in the length direction Y. The liquid injection hole 111 and the blocking member 2 are disposed on the first end 11a. The cap plate 11 further includes a boss 112 provided on the bottom surface. The boss 112 is disposed in correspondence to the first end 11a in the thickness direction X. The boss 112 is adapted to press against the electrode assembly 5 of the power battery to prevent the electrode assembly 5 from moving up and down in the case 4 and thus improve the positional stability and anti-vibration performance of the electrode assembly 5. Optionally, the boss 112 and the first end 11a are formed as an integral structure.

In the present embodiment, the blocking member 2 is connected to the boss 112 and a bottom face of the blocking member 2 is flush with that of the boss 112. The bottom surface of the blocking member 2 and the bottom surface of the boss 112 can be configured to simultaneously press against the end portion of the electrode assembly 5. The liquid outlet of the fluid channel 3 formed by the blocking member 2 and the cap plate 11 faces the electrode terminal 12. Preferably, a predetermined angle of 90° is formed between the fluid channel 3 and the liquid injection hole 111, so that the electrolyte can be injected into the injection hole 111 in the thickness direction X and discharge from the fluid channel 3 in the length direction Y, reducing the impact force applied by the electrolyte to the electrode assembly 5 along the thickness direction X.

In the case that the cap assembly 1 of the present embodiment is applied to a power battery, and the electrolyte injection operation of the power battery is performed, the power battery can be placed horizontally, that is, the cap plate 11 is placed in an upright position (which can be obtained by rotating the power battery oriented as shown in FIG. 7 or FIG. 8 by 90 degrees in a counterclockwise direction). In this case, the first end 11a is located above the second end 11b, and then the electrolyte injection operation can be performed. In this way, since the liquid injection hole 111 provided on the first end 11a of the cap plate 11 is located at a higher position, the electrolyte discharging from the fluid channel 3 will flow along a parabolic trajectory due to its own gravity, and thus the impact force applied on the end portion of the electrode assembly 5 can be reduced. In addition, since both the liquid injection hole 111 and the fluid channel 3 are located at the first end 11a, more electrolyte can be injected into the case 4.

In the present embodiment, optionally, the blocking member 2 and the boss 112 are formed as an integral structure, which can improve the connection strength between them and facilitate one-time manufacturing of the two parts, thereby reducing the processing steps and the processing difficulties.

Optionally, the cap plate 11 further includes two bosses 112 disposed on the bottom surface. One boss 112 is disposed in correspondence to the first end 11a in the thickness direction X, while the other boss 112 is disposed in correspondence to the second end 11b in the thickness direction X, so as to prevent the electrode assembly 5 from moving up and down in the case 4 more effectively.

In the present embodiment, the cap assembly 1 further includes a vent plate 113. The vent plate 113 is disposed on the top surface of the cap plate 11 and covers the liquid injection hole 111. An edge of the vent plate 113 and the top surface of the cap plate 11 form an annular seam, so that the vent plate 113 and the cap plate 11 are hermetically connected. After the electrolyte injection operation through the liquid injection hole 111 is completed, the vent plate 113 is hermetically connected to the top surface of the cap plate 11, so that the interior of the power battery can be sealed. In the case that a pressure inside the power battery is greater than a design pressure of the vent plate 113, the vent plate 113 may rupture, so as to release the internal pressure of the power battery and ensure the safety of the power battery.

In the present embodiment, optionally, the vent plate 113 may be formed in a long strip or a circular shape.

In one embodiment, as shown in FIG. 1 and FIG. 5, an axis of the liquid injection hole 111 is provided offset from an axis 113a of the vent plate 113, and the axis 113a of the vent plate 113 is closer to the second end 11b of the cap plate 11 than the axis of the liquid injection hole 111. The axis 113a of the vent plate 113 refers to a center axis of the vent plate 113 that is perpendicular to the length direction Y. In this way, on the one hand, it is beneficial to increase the force bearing area of the vent plate 113; on the other hand, in the case that the electrolyte is injected from the liquid injection hole 111, more electrolyte can be injected into the case 4 while being effectively prevented from overflowing via the liquid injection hole 111.

In an embodiment, a ratio of a surface area of the vent plate 113 in the annular seam to a cross-sectional area of the liquid injection hole 111 is of 1.5 to 10. The surface area of the vent plate 113 inside the annular seam is an effective force bearing area of the vent plate 113. The gas discharging from the liquid injection hole 111 can exert compressive stress on the surface of the vent plate 113 located inside the annular seam. The cross-sectional area of the liquid injection hole 111 refers to a projection area of the liquid injection hole 111 in the thickness direction X. The larger the surface area of the vent plate 113 inside the annular seam, the less the pressure it needs to rupture.

In one embodiment, the top surface of the cap plate 11 has a recess that is depressed toward the bottom surface. The liquid injection hole 111 communicates with the recess, and the vent plate 113 is accommodated in the recess. The recess provided on the top surface of the cap plate 11 can be used to position the vent plate 113 so as to quickly mount and fix the vent plate 113 to a predetermined position on the cap plate 11. Meanwhile, it is convenient to perform a welding operation to form the seam between the vent plate 113 and the cap plate 11, thus facilitating a quick connection between the vent plate 113 and the cap plate 11. In addition, the increase of the thickness of the cap plate 11 due to the provision of the vent plate 113 can be avoided.

The cap assembly 1 according to the embodiment of the present disclosure includes a cap plate 11 which has a liquid injection hole 111 and a blocking member 2 which is disposed on the cap plate 11 for covering the liquid injection hole 111. In the case when the cap assembly 1 of the present disclosure is applied to a power battery, during the electrolyte injection operation of the power battery, the high-pressure electrolyte injected from the liquid injection hole 111 is blocked by the blocking member 2, changes the flow direction and no longer flows along the axial direction of the liquid injection hole 111. Therefore, the flow rate of the electrolyte entering the case 4 can be reduced by the blocking member 2, reducing the impact force exerted by the electrolyte on the end portion of the electrode assembly 5 of the power battery compared to the case that the electrolyte discharges directly from the liquid injection hole 111, and thus reducing the probability of short circuit between the positive electrode sheet and the negative electrode sheet of the electrode assembly due to the displacement of the separating membrane of the electrode assembly 5 caused by a larger impact force. As shown in FIG. 6, the present disclosure further provides a power battery which includes a case 4 having an opening, an electrode assembly 5 disposed in the case 4, and a cap assembly 1 connected to the case 4 and covering the opening of the case 4. In the present embodiment, the electrode assembly 5 is formed by a positive electrode sheet, a negative electrode sheet, and a separating membrane disposed between the positive electrode sheet and the negative electrode sheet that are wound around a winding axis. The electrode assembly 5 has two end portions opposed to each other along the winding axis. The wound positive electrode sheet, the negative electrode sheet, and the separating membrane provided between the positive electrode sheet and the negative electrode sheet form a spiral wound structure as seen from the end portions of the electrode assembly 5. The cap assembly 1 is disposed in correspondence to the end portion of the electrode assembly 5, wherein the blocking member 2 is disposed between the cap plate 11 of the cap assembly 1 and the end portion of the electrode assembly 5.

In one embodiment, as shown in FIG. 7, the case 4 of the power battery is a columnar structure comprising two openings. The electrode assembly 5 is disposed within the case 4, and the winding axis of the electrode assembly 5 is parallel to the thickness direction X. The two end portions of the electrode assembly 5 along the winding axis respectively correspond to the two openings. One of the two end portions is provided with a positive electrode tab 51 and the other is provided with a negative electrode tab 52. The two cap assemblies 1 respectively cover the two openings. One electrode terminal 12 is provided on each of the cap assemblies 1. The electrode terminal 12 on the one of the two cap assemblies 1 is electrically connected to the positive electrode tab 51 of the electrode assembly 5 and the other is electrically connected to the negative electrode tab 52 of the electrode assembly 5.

In the present embodiment, the first end 11a and the second end 11b of the cap plate 11 of the cap assembly 1 are each provided with a boss 112, so that the bosses 112 on the first end 11a and the second end 11b can simultaneously press against the end portion of the electrode assembly 5 so as to fix the position of the electrode assembly 5 better. A gap is formed between the two bosses 112 to accommodate the positive electrode tab 51 or the negative electrode tab 52.

When the electrolyte injection operation is performed for the power battery of the preset embodiment, the power battery can be placed horizontally at first, that is, the cap plate 11 is placed in an upright position, the first end 11a is located above the second end 11b, and the electrode terminal 12 is placed horizontally, and then the electrolyte injection operation can be performed. In this way, the liquid injection hole 111 on the cap plate 11 is located at a higher position, and the electrolyte discharging from the fluid channel 3 will be blocked by the blocking member 2. Therefore, the flow rate of the electrolyte can be reduced, and thus the impact force applied on the end portion of the electrode assembly 5 can be reduced. Meanwhile, the electrolyte discharging from the fluid channel 3 will flow along a parabolic trajectory due to its own gravity, which further reduces the impact force applied on the end portion of the electrode assembly 5.

Optionally, as shown in FIG. 7, the liquid injection hole 111 provided on each of the cap assemblies 1 is located between the electrode terminal 12 and the first end 11a. The liquid injection holes 111 respectively disposed on the two cap assemblies 1 are correspondingly arranged in the length direction Y. In this way, on the one hand, the electrolyte can be injected into the case 4 simultaneously via the two liquid injection holes 111, so as to improve the liquid injection efficiency; on the other hand, since the two liquid injection holes 111 are disposed correspondingly to each other, it can be ensured that the levels of the electrolyte respectively injected via the two liquid injection holes 111 remain the same, so as to avoid the electrolyte injected from the liquid injection hole 111 at a higher position overflow from the liquid injection hole 111 at a lower position.

Optionally, as shown in FIG. 8, a liquid injection hole 111 provided on each of the cap assemblies 1 is located on the first end 11a of the cap plate 11. The liquid injection holes 111 respectively disposed on the two cap assemblies 1 are correspondingly arranged in the length direction Y. In this way, on the one hand, the electrolyte can be injected into the case 4 simultaneously via the two liquid injection holes 111, so as to improve the liquid injection efficiency; on the other hand, since the two liquid injection holes 111 are disposed correspondingly to each other, it can be ensured that the levels of the electrolyte respectively injected via the two liquid injection holes 111 remain the same, so as to avoid the electrolyte injected from the liquid injection hole 111 at a higher position overflow from the liquid injection hole 111 at a lower position; and in addition, since the liquid injection hole 111 is close to the end portion of the cap plate 11, the amount of electrolyte injected can be further increased.

The power battery according to the embodiment of the present disclosure includes a cap assembly 1 which has a liquid injection hole 111 and a blocking member 2, and an electrode assembly 5 which is formed by the positive electrode sheet, the negative electrode sheet, and the separating membrane provided between the positive electrode sheet and the negative electrode sheet wound around a winding axis. During the electrolyte injection operation, since the electrolyte injected through the liquid injection hole 111 is blocked by the blocking member 2, the electrolyte discharging from the liquid injection hole 111 will turn at a predetermined angle and then discharge from the fluid channel 3 formed by the blocking member 2 and the cap plate 11. As a result, the impact force exerted by the electrolyte on the end portion of the electrode assembly 5 can be reduced, effectively reducing the probability of the short circuit between the positive electrode sheet and the negative electrode sheet, which is caused by the separating membrane included in the electrode assembly 5 deviates away from a position between the positive electrode sheet and the negative electrode sheet, and effectively ensuring the safety and yield rate of the power battery.

Although the present disclosure has been described with reference to the preferred embodiments, various modifications may be made thereto and components thereof may be substituted by equivalents without departing from the scope of the present disclosure. In particular, as long as there is no structural conflict, the various technical features mentioned in the various embodiments may be combined in any way. The present disclosure is not limited to the specific embodiments disclosed herein, but includes all the technical solutions falling within the scope of the claims.

What is claimed is:

1. A cap assembly for a power battery, wherein the cap assembly comprising:
a cap plate including a top surface, a bottom surface opposed to the top surface in a thickness direction, and a liquid injection hole penetrating through the cap plate from the top surface to the bottom surface and having an inlet provided on the top surface and an outlet provided on the bottom surface; and
a blocking member provided on the bottom surface of the cap plate, wherein a projection of the blocking member in the thickness direction completely covers the outlet of the liquid injection hole,
wherein a fluid channel is formed between the blocking member and the cap plate, and the fluid channel communicates with the outlet of the liquid injection hole, and
wherein the fluid channel is formed at a predetermined angle relative to an axis of the liquid injection hole and has a liquid outlet, so that an electrolyte discharging from the outlet of the liquid injection hole discharges from the liquid outlet of the fluid channel formed by the blocking member and the cap plate after turning at the predetermined angle.

2. The cap assembly according to claim 1, wherein the cap plate comprises a first end and a second end opposed to the first end in a length direction, and the liquid outlet of the fluid channel faces the first end or faces away from the first end in the length direction.

3. The cap assembly according to claim 2, wherein the liquid injection hole and the blocking member are provided at the first end.

4. The cap assembly according to claim 3, wherein the cap plate comprises a boss provided on the bottom surface, disposed in correspondence to the first end, and adapted to press against an electrode assembly of the power battery, wherein the blocking member is connected to the boss and has a bottom face flush with that of the boss.

5. The cap assembly according to claim 3, wherein the cap assembly further comprises a vent plate which is disposed on the top surface and covers the liquid injection hole, wherein an annular seam is formed between an edge of the vent plate and the top surface of the cap plate, so that the vent plate and the cap plate are hermetically connected.

6. The cap assembly according to claim 5, wherein an axis of the liquid injection hole is offset from an axis of the vent plate, and the axis of the vent plate is closer to the second end of the cap plate than the axis of the liquid injection hole.

7. The cap assembly according to claim 5, wherein a ratio of a surface area of the vent plate located inside the annular seam to a cross-sectional area of the liquid injection hole is of 1.5 to 10.

8. The cap assembly according to claim 5, wherein the top surface of the cap plate is provided with a recess depressed toward the bottom surface, wherein the liquid injection hole communicates with the recess and the vent plate is accommodated in the recess.

9. The cap assembly according to claim 1, wherein the blocking member and the cap plate are formed as an integral structure.

10. A power battery, wherein comprising:
a case having an opening;
an electrode assembly formed by a positive electrode sheet, a negative electrode sheet, and a separating membrane provided between the positive electrode sheet and the negative electrode sheet that are wound around a winding axis, the electrode assembly having two end portions opposed to each other along the winding axis, the electrode assembly being disposed in the case; and
a cap assembly for covering the opening of the case and disposed in correspondence to the end portion of the electrode assembly,
wherein the cap assembly comprising:
a cap plate including a top surface, a bottom surface opposed to the top surface in a thickness direction, and a liquid injection hole penetrating through the cap plate from the top surface to the bottom surface and having an inlet provided on the top surface and an outlet provided on the bottom surface; and
a blocking member provided on the bottom surface of the cap plate, wherein a projection of the blocking member in the thickness direction completely covers the outlet of the liquid injection hole,
wherein a fluid channel is formed between the blocking member and the cap plate, and the fluid channel communicates with the outlet of the liquid injection hole,
wherein the blocking member is disposed between the cap plate and the end portion of the electrode assembly, and
wherein the fluid channel is formed at a predetermined angle relative to an axis of the liquid injection hole and has a liquid outlet, so that an electrolyte discharging from the outlet of the liquid injection hole discharges from the liquid outlet of the fluid channel formed by the blocking member and the cap plate after turning at the predetermined angle.

11. The cap assembly according to claim 10, wherein the cap plate comprises a first end and a second end opposed to the first end in a length direction, and the liquid outlet of the fluid channel faces the first end or faces away from the first end in the length direction.

12. The cap assembly according to claim 11, wherein the liquid injection hole and the blocking member are provided at the first end.

13. The cap assembly according to claim 12, wherein the cap plate comprises a boss provided on the bottom surface, disposed in correspondence to the first end, and adapted to press against an electrode assembly of the power battery, wherein the blocking member is connected to the boss and has a bottom face flush with that of the boss.

14. The cap assembly according to claim 12, wherein the cap assembly further comprises a vent plate which is disposed on the top surface and covers the liquid injection hole, wherein an annular seam is formed between an edge of the vent plate and the top surface of the cap plate, so that the vent plate and the cap plate are hermetically connected.

15. The cap assembly according to claim 14, wherein an axis of the liquid injection hole is offset from an axis of the vent plate, and the axis of the vent plate is closer to the second end of the cap plate than the axis of the liquid injection hole.

16. The cap assembly according to claim 14, wherein a ratio of a surface area of the vent plate located inside the annular seam to a cross-sectional area of the liquid injection hole is of 1.5 to 10.

17. The cap assembly according to claim 14, wherein the top surface of the cap plate is provided with a recess depressed toward the bottom surface, wherein the liquid injection hole communicates with the recess and the vent plate is accommodated in the recess.

18. The cap assembly according to claim 10, wherein the blocking member and the cap plate are formed as an integral structure.

\* \* \* \* \*